(12) United States Patent
An et al.

(10) Patent No.: US 8,922,716 B2
(45) Date of Patent: Dec. 30, 2014

(54) VIDEO DISPLAY APPARATUS TO DISPLAY OSD AT A FIRST REGION OR A SECOND REGION AND CONTROL METHOD THEREOF

(71) Applicants: Hongyong An, Seoul (KR); Kyunghak Park, Seoul (KR)

(72) Inventors: Hongyong An, Seoul (KR); Kyunghak Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/204,645

(22) Filed: Mar. 11, 2014

(65) Prior Publication Data

US 2014/0267913 A1  Sep. 18, 2014

(30) Foreign Application Priority Data

Mar. 14, 2013  (KR) ........................ 10-2013-0027456

(51) Int. Cl.
*H04N 5/50* (2006.01)
*H04N 5/44* (2011.01)
*H04N 21/422* (2011.01)

(52) U.S. Cl.
CPC ....... *H04N 5/4403* (2013.01); *H04N 21/42221* (2013.01)
USPC ........................................................ 348/569

(58) Field of Classification Search
USPC ............ 348/569, 563–566; 345/87, 168, 204; 715/738, 781
See application file for complete search history.

(56) References Cited

U.S. PATENT DOCUMENTS

| | | | |
|---|---|---|---|
| 8,259,232 B2 * | 9/2012 | Iino ............................... | 348/564 |
| 8,656,302 B2 * | 2/2014 | Nagano et al. ................ | 715/781 |
| 8,700,598 B2 * | 4/2014 | Song et al. .................... | 707/708 |
| 2002/0076206 A1 * | 6/2002 | Hyatt .............................. | 386/95 |
| 2006/0071921 A1 * | 4/2006 | Park et al. ..................... | 345/204 |
| 2007/0285364 A1 * | 12/2007 | Nakagawa et al. ............ | 345/87 |
| 2010/0001957 A1 * | 1/2010 | Lee ............................... | 345/168 |
| 2010/0073564 A1 * | 3/2010 | Iino ............................... | 348/563 |
| 2012/0210239 A1 * | 8/2012 | Kim et al. ..................... | 715/738 |

* cited by examiner

*Primary Examiner* — Paulos M Natnael
(74) *Attorney, Agent, or Firm* — KED & Associates LLP

(57) ABSTRACT

A video display apparatus includes: a display unit configured to output screen information; a user interface unit including a local key input unit and remote controller receiving unit formed to receive a control signal for outputting an on-screen display (OSD) for controlling screen information to the display unit; and a controller configured to detect a user interface unit to which the control signal is input among the local key input and the remote controller receiving unit and control the display unit to output the OSD to any one of first and second regions which correspond to the local key input unit and the remote controller receiving unit and are placed at different positions in the display unit.

27 Claims, 15 Drawing Sheets

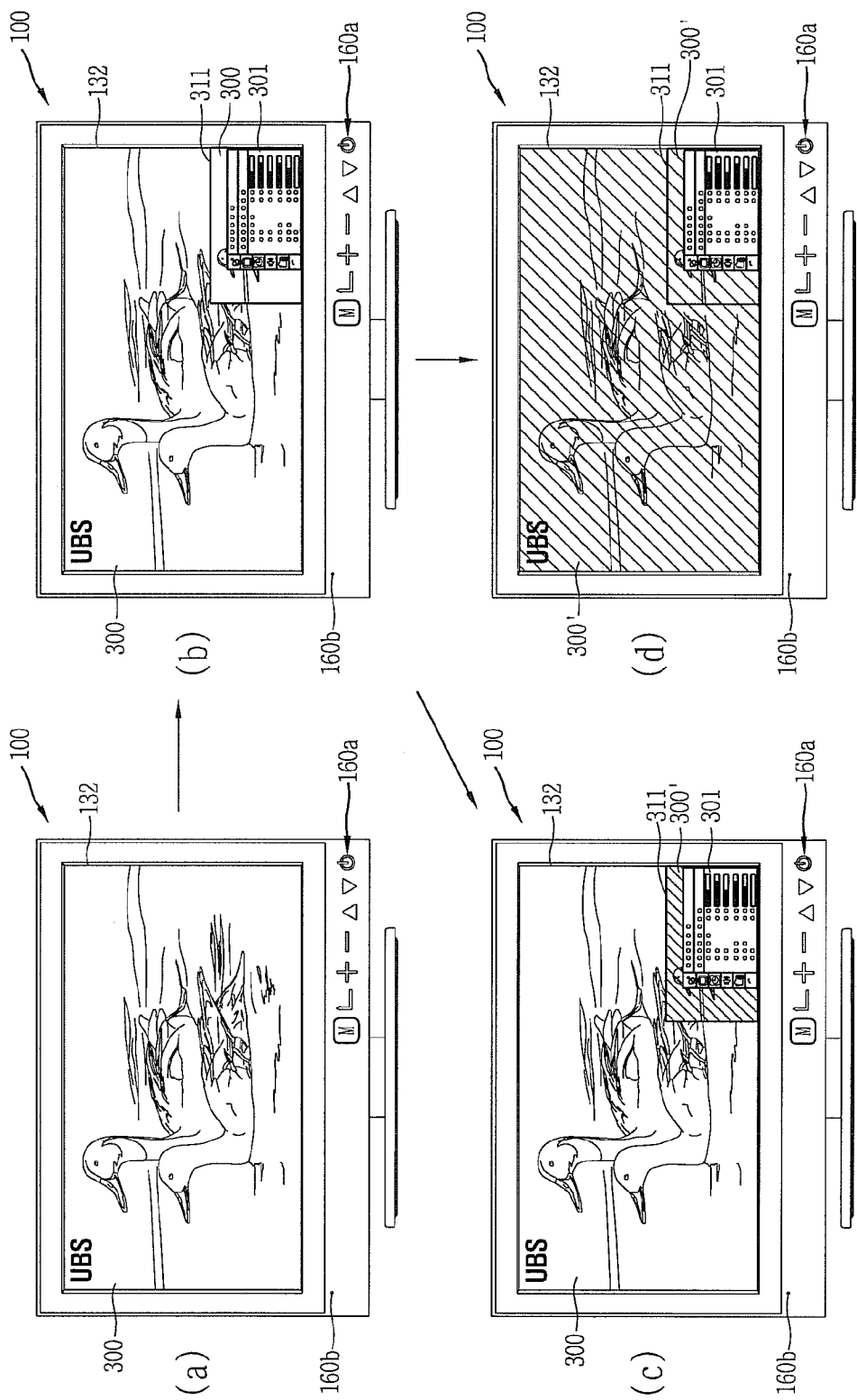

VIDEO DISPLAY APPARATUS TO DISPLAY OSD AT A FIRST REGION OR A SECOND REGION AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2013-0027456, filed in Republic of Korea on Mar. 14, 2013 the contents of which are incorporated by reference herein in it entirety.

BACKGROUND OF THE INVENTION

1. Field of the Invention

The present disclosure relates to a video display apparatus and a control method thereof.

2. Background of the Invention

In general, terminals may be divided into a mobile terminal and stationary terminal according to whether or not terminals are movable. In addition, mobile terminals may be divided into a handheld terminal and a vehicle mount terminal according to whether or not users can directly carry it around.

In general, a video display apparatus outputting video controls a configuration state of video based on a user's control command. For example, a user may control an output state of video such as brightness, chroma, and the like, as well as a type of the image.

Recently, display units outputting images of video display apparatuses tend to be increased in size, and in order to promote convenience of controlling video display apparatuses, a control command may be applied to the video display apparatus by using a remote controller in a location away from the video display devices.

Also, the video display apparatus may further include a signal input unit formed in a region adjacent to the display unit to apply a pre-set control command in addition to controlling through the remote controller. Namely, a user may use the remote controller or the signal input unit to control an image of the large display unit.

However, in the case in which video output to the display unit is controlled through the signal input unit, user's eyes are positioned to be adjacent to the display unit. Thus, when video is controlled through the signal input unit, only an extremely small portion of the image may be recognized, causing user inconvenience that the video output according to the control command is not accurately recognized.

SUMMARY OF THE INVENTION

Therefore, an aspect of the detailed description is to provide various type of video based on means of controlling the video display apparatus.

To achieve these and other advantages and in accordance with the purpose of the present disclosure, as embodied and broadly described herein, the present disclosure provides in one aspect a video display apparatus including: a display unit configured to output screen information; a user interface unit including a local key input unit and remote controller receiving unit formed to receive a control signal for outputting an OSD for controlling screen information to the display unit; and a controller configured to detect a user interface unit to which the control signal is input among the local key input and the remote controller receiving unit and control the display unit to output the OSD to any one of first and second regions which correspond to the local key input unit and the remote controller receiving unit and are placed at different positions in the display unit.

In an example related to the present disclosure, the first region may be formed in a region of the display unit adjacent to the local key input unit.

In an example related to the present disclosure, the video display apparatus may further include: an external signal input unit configured to receive a broadcast signal corresponding to each of a plurality of channels; and a speaker configured to output a sound, wherein the local key input unit may include: a menu input key configured to receive the control signal for outputting the OSD to the display unit; a channel adjustment input key configured to receive a control command for adjusting a channel; a sound volume adjustment input key configured to receive a control command for adjusting a sound volume; and an OK key configured to receive a control command for selecting one of information included in the OSD.

In an example related to the present disclosure, the local key input unit may include a plurality of input keys disposed to be spaced apart from one another, and the controller may control the display unit to output the OSD to a region of the display unit adjacent to each of the plurality of input keys based on a control signal input to the plurality of local keys.

In an example related to the present disclosure, the OSD displayed in the first region or the second region may be output to overlap with a region of the screen information, and a size of the OSD displayed in the first region may be smaller than a size of the OSD displayed in the second region.

In an example related to the present disclosure, the controller may change a size of the first or second region and a position of the first or second region in the display unit based on a user setting.

In an example related to the present disclosure, when a control signal is applied to the local key input unit in a state in which the OSD is displayed in the second region, the controller may control the display unit to output the OSD to the first region.

In an example related to the present disclosure, when a control signal is applied to the local key input unit, the controller may control the display unit to output the OSD to both the first and second regions.

In an example related to the present disclosure, when a different control signal is input to the local key input unit, the controller may control the display unit to change information included in the OSD displayed in the first and second regions and output the same based on the different control signal.

In an example related to the present disclosure, when a different control signal is applied to the IR receiving unit in a state in which the OSD is displayed in the first region, the controller may control the display unit to output the OSD to the second region.

In an example related to the present disclosure, the video display apparatus may further include a sensor unit configured to sense a user located to be adjacent to the display unit, wherein when the user is sensed by the sensor unit, the controller may control the display unit to continuously output the OSD to the first region.

In an example related to the present disclosure, the controller may control the display unit to output a preview window outputting screen information displayed in the first region and reduced in a pre-set ratio, and the controller may control the display unit to output the OSD displayed in the first region such that the OSD covers a portion of the reduced screen information displayed in the preview window.

In an example related to the present disclosure, the controller may change information included in the OSD based on a different control signal input to the local key input unit, and the controller may control the display unit to change the reduced screen information based on the changed information.

In an example related to the present disclosure, the controller may control the display unit to change the screen information output to the display unit based on the changed information.

In an example related to the present disclosure, the information included in the OSD may include at least one tap, and the controller may control the display unit to differently display a layout of taps of the OSD displayed in the first region and a layout of taps of the OSD displayed in the second region.

To achieve these and other advantages and in accordance with the purpose of the present disclosure, as embodied and broadly described herein, the present disclosure provides in another aspect a control method of a video display apparatus, including: outputting screen information to a display unit; receiving a control signal for changing an output state of screen information by a local key input unit or an IR receiving unit; detecting one of the local key input unit and the IR receiving unit to which the control signal is input; and outputting an OSD including information for changing the output state to any one of first and second regions of the display unit each corresponding to the local key input unit and the IR receiving unit.

In an example related to the present disclosure, the control method may further include: calculating a size of the OSD to output the OSD to the first region or the second region; and combining the OSD and the screen information and outputting the same to the display unit.

In an example related to the present disclosure, the control method may further include: outputting the OSD to the second region by a control signal input to the IR receiving unit, in a state in which the OSD is output to the first region.

According to exemplary embodiments of the present disclosure, since OSDs in different forms are output based on types of signal input units to which a control command is applied, a user may be provided with information in an appropriate form at a current location to control the video display apparatus.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein:

FIG. 8 is a conceptual view illustrating a method of controlling a video display apparatus according to another exemplary embodiment of the present disclosure.

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

In the following description, usage of suffixes such as 'module', 'part' or 'unit' used for referring to elements is given merely to facilitate explanation of the present disclosure, without having any significant meaning by itself.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The exemplary embodiments of the present disclosure will now be described with reference to the accompanying drawings, in which like numbers refer to like elements throughout.

In describing, the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

Figure 1:
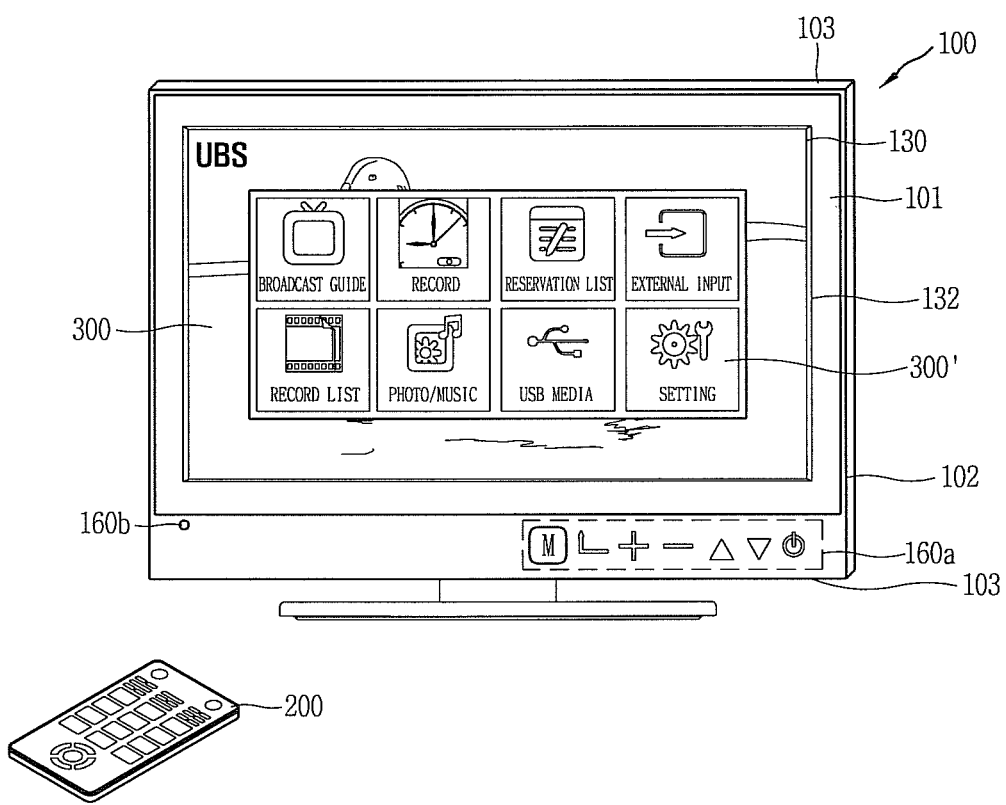
FIG. 1 is a conceptual view of a video display apparatus according to an exemplary embodiment of the present disclosure.
Figure 2:
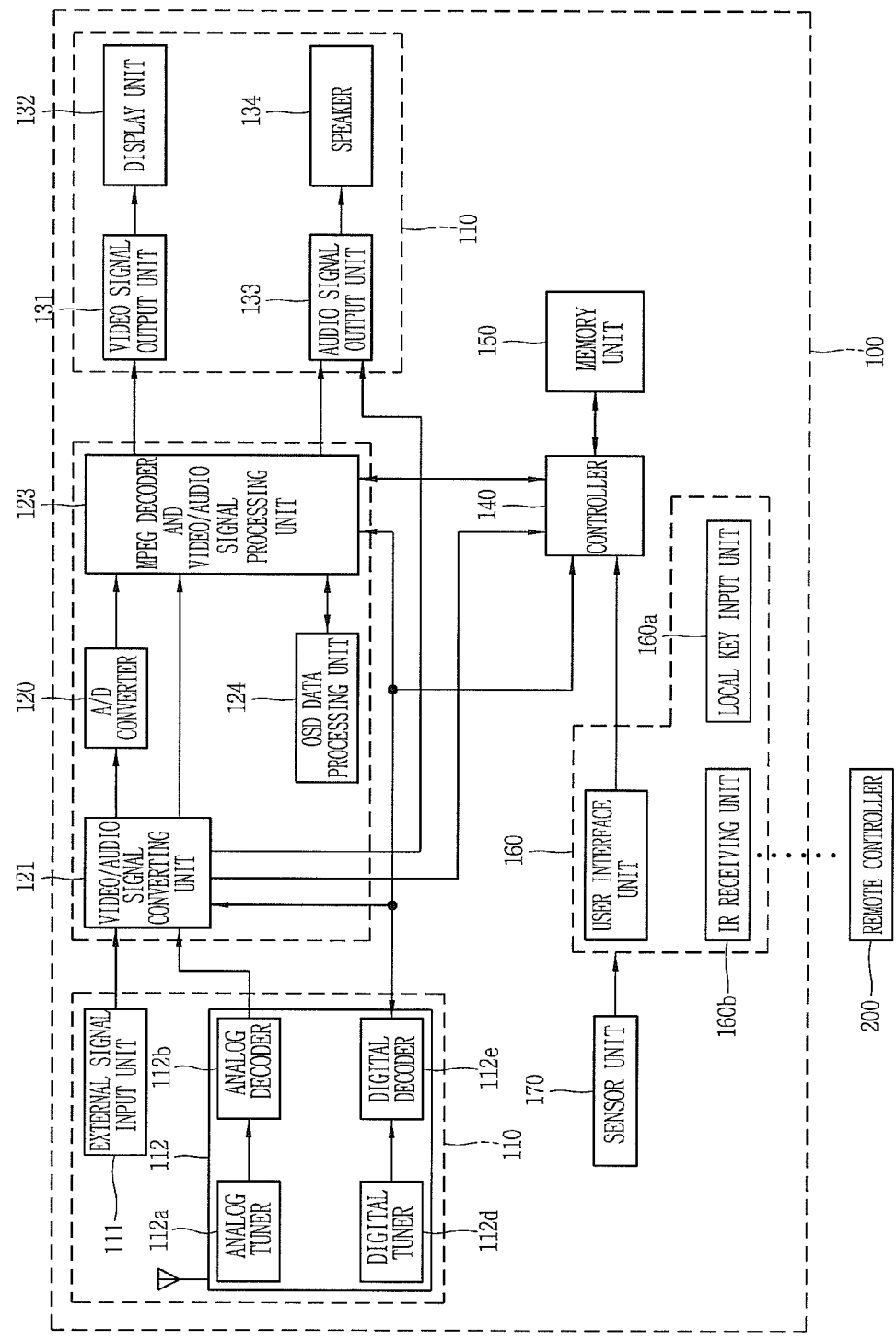
FIG. 2 is a conceptual view illustrating a video display apparatus according to an exemplary embodiment of the present disclosure.

FIG. 1 is a conceptual view of a video display apparatus according to an exemplary embodiment of the present disclosure, and FIG. 2 is a conceptual view illustrating a video display apparatus according to an exemplary embodiment of the present disclosure.

Referring to FIGS. 1 and 2, a video display apparatus according to an exemplary embodiment to which an exemplary embodiment of the present disclosure is applied may include a receiving unit 110, a processing unit 120, an output unit 130, a controller 140, a memory unit 150, and a user interface unit 160.

The receiving unit 110 may include an external signal input unit 111 and a tuner 112. The processing unit 120 may include a video/audio signal converting unit 121, an A/D converter 122, an MPEG decoder and video/audio signal processing unit 123, and an OSD data processing unit 120. The output unit 130 may include a video signal output unit 131, a display unit 132, an audio signal output unit 133, and a speaker 134.

The external signal input unit 111 may receive an external signal received from an external device such as a digital versatile disk (DVD), a set-top box, a camcorder, or the like, and provide the received external signal to the video/audio signal converting unit 121.

The tuner unit 122 tunes at least one channel according to a control signal from the controller 140, decodes or splits a video/audio/data signal received through the tuned channel and provides the same to the video/audio signal converting unit 121, or the like.

The tuner unit 112 may receive information regarding received sensitivity and signal quality with respect to a received broadcast signal, and the video processing unit 123 generates the received information as a predetermined image, and provide the same.

The video/audio signal converting unit 121 may include a demultiplexer for selecting at least on channel from among channels provided from the external signal input unit 111 and the tuner unit 112, splitting a video/audio signal of the selected channel as needed, and split an MPEG decoder and a video/audio/data signal. In a case in which the signal selected by the video/audio signal converting unit 121 is an analog signal, a video signal and an audio signal of the analog signal are split, and the analog video signal is converted into a digital video signal by the AD converter 122 and provided to the MPEG decoder and the video/audio signal processing unit 123, and the analog audio signal may be provided to the audio signal output unit 133. Also, in a case in which the signal selected by the video/audio signal converting unit 121 is a digital signal, both a video signal and an audio signal of the digital signal may be provided to the MPEG decoder and the video/audio signal processing unit 123.

The MPEG decoder and video/audio signal processing unit 123 may restore a video/audio stream of an output signal of the video/audio signal converting unit 121, as video/audio data, process the restored data, and the processed video signal is provided to the video signal output unit 131. Also, the MPEG decoder and video/audio signal processing unit 123 may mix OSD data generated by the OSD data processing unit 124 and the restored and processed video signal.

In particular, the processing unit 120 according to an exemplary embodiment of the present disclosure includes an OSD data processing unit 124. The OSD data processing unit 124 detects whether a control signal is input from a user in a video output mode, and when a control signal is not input for a predetermined period of time, the OSD data processing unit 124 adjusts transparency of a displayed screen to generate an OSD. An OSD generated by the OSD data processing unit 124 is adjusted under the control of the controller 140, and the OSD data processing unit 124 generates an OSD while gradually decreasing or increasing transparency thereof.

The video signal output unit 131 processes a video signal output from the MPEG decoder and video/audio signal processing unit 123 and an OSD layer processed by the OSD data processing unit 124 and outputs the same. Also, the audio signal output unit 133 processes an audio signal output from the MPEG decoder and video/audio signal processing unit 123 into a form that may be output through a speaker 134. In particular, in a case in which transparency of an OSD layer is adjusted according to an exemplary embodiment of the present disclosure, an audio output may be adjusted to be temporarily stopped or a volume thereof may be turned down so as to be output.

The user interface unit 160 may include a local key input unit 160a provided in the video display apparatus and an IR receiving unit 160b for receiving a control signal delivered by a remote controller, for example.

Meanwhile, referring to FIG. 1, the local key input unit 160a may be formed in a region adjacent to the display unit 132. For example, the local key input unit 160a may be formed in a front surface 101 in which the display unit 132 of the video display apparatus 100 is formed. As illustrated, the local key input unit 160a may be formed to be adjacent to a lower end portion of the display unit 132. However, the position of the local key input unit 160a formed in the video display apparatus 100 is not limited thereto, and the local key input unit 160a may be formed in a left or right lateral surface 102 and/or an upper and lower surface 103.

Also, the local key input unit 160a may employ any method as long as it allows a user to perform manipulation in a tactile manner with a tactile feeling. For example, the local key input unit 160a may be implemented as a dome switch, a touch screen, or a touch pad allowing a signal to be received by a user push or touch manipulation.

A signal input by the local key input unit 160a may be variously set, and the local key input unit 160a may include a plurality of input keys that receive a control signal independently.

Referring to FIG. 1, the local key input unit 160a may include at least six input keys. For example, the local key input unit 160a may include a channel change input key (Δ/∇) for increasing or decreasing a channel number, a sound volume control input key (+/−) for increasing or decreasing a volume of a sound output from the speaker 134, a menu input key (M0 for receiving a control signal for outputting an on screen display (OSD) for changing a setting of various types of information, an acknowledgement input key for applying an input signal for changing a setting of information in the OSD.

Meanwhile, in a case in which an input with respect to a movement in any one direction among four directions is required, two channel change input keys and two sound volume control input keys may receive a movement control signal in up/down/left/right directions.

The local key input unit 160*a* may further include a power input key for receiving a control signal for turning on and off power of the video display apparatus 100.

Also, the plurality of input keys may be arranged to be adjacent to each other, but the present disclosure is not limited thereto. Input keys for generating control signals for controlling irrelevant functions may be disposed in different regions separately in the video display apparatus 100.

Various commands and information are received from a user, converted into control signals and delivered into the controller 140. In particular, when a control signal is not input for a predetermined period of time in a video output mode, the user interface unit 160 according to an exemplary embodiment of the present disclosure may adjust transparency of a display screen. The controller 140 may control the tuner unit 112, the video/audio signal converting unit 121, and the MPEG decoder and video/audio signal processing unit 123, and any other element of the video display apparatus may be connected to the controller 140 so as to be controlled, if necessary.

The user interface unit 160 may further include an IR receiving unit 160*b* for receiving a control signal input by the remote controller 200. The IR receiving unit 160*b* may be formed in a front surface 101 of the video display apparatus 100. A control signal input by the local key input unit 160*a* may be applied to the video display apparatus 100 by using the remote controller 200.

Namely, the user may control the video display apparatus 100 by using any one of the local key input unit 160*a* and the IR receiving unit 160*b* wirelessly connected to the remote controller 200. In order to receive a wireless signal from the remote controller, the IR receiving unit 160*b* may be formed in the front surface 101 of the video display apparatus 100 adjacent to the display unit 132. Also, the IR receiving unit 160*b* may be disposed to be adjacent to the local key input unit 160*a* or spaced apart therefrom.

The controller 140 may recognize whether a control signal is input through the user interface unit 160 in the video output mode. In particular, the controller 160 according to an exemplary embodiment of the present disclosure determines from which one of the local key input unit 160*a* and the IR receiving unit 160*b*, the control signal has been applied, and controls the display unit 132 to output OSDs in different positions thereof.

Here, an OSD is a pop-up window displaying configuration information adjustable to allow a user to directly optimize a screen of the display unit 132. The user may adjust configuration information of a screen including an OSD window appearing in a screen, and optimize the screen by using a test program.

Referring to FIG. 1, the display unit 132 outputs screen information 300, and an OSD 302 may be formed to overlap with at least a portion of the screen information 300. The OSD 302 may be output to be translucent or opaque based on a user setting regarding transparency. A position to which the OSD 302 is output may be changed by a user setting. Here, the screen information 300 corresponds to visual information which has converted from a signal received from the receiving unit 110 and the external signal input unit 111. Namely, the screen information 300 may be an image corresponding to a broadcast signal or an image based on an external signal received from an external device, and types of screen information are not limited.

Referring to FIG. 1, the OSD 302 may include a 'detailed setting' icon selectable to change a setting regarding outputting various types information by the video display apparatus 100. The controller 140 may touch (press) an input key included in the local key input unit 160*a* or press an input key included in the remote controller 200 to output additional information regarding the detailed setting, and change a setting included therein.

Also, as illustrated in the OSD 302 of FIG. 1, the OSD 302 may include a 'broadcast guidance' tap (including a program guide (EPF), for example) providing information regarding a broadcast to which the video display apparatus 100 is wirelessly connected to provide information, a 'record' tap and a 'record list' tap for outputting a function for setting recording of provided information and a recorded list, a 'reservation list' tap including a function for setting various functions of the video display apparatus 100 to be driven at a pre-set time, an 'external input' and 'usb media' tap for controlling an external device connected to the video display apparatus 100 in a wired manner or wirelessly, and a 'photo/music' tap for outputting a photograph and music stored in the memory unit 150 of the video display apparatus 100.

The OSD output to the display unit 132 may disappear when a pre-set period of time has lapsed, or an output of the OSD may be limited based on a manipulation of the user interface unit 160.

A user may moved to each tap by input keys included in the local key input unit 160 and adjusting up/down/left/right (when the user moved to each tap, the controller 140 may control the display unit 132 to highlight each tap such that a color of each tap is changed), and the user may enter a lower stage of each tap by using the input key. Meanwhile, the OSD 302 may be controlled by using the remote controller 200.

The memory unit 150 may store information input by the user or data generated or managed by the controller 140.

The sensing unit 170 may be formed in a region adjacent to the display unit 132. The sensing unit may be implemented as a proximity sensor, and senses a user located near the display unit 132.

According to a control method according to an exemplary embodiment of the present disclosure, when control signals for executing the substantially same function are received through the local input unit 160*a* or the IR receiving unit 160*b* using the remote controller 200, the controller 140 controls the display unit 132 to output the OSDs to different positions of the display unit 132 based on the control signals.

Hereinafter, OSDs output based on control signals and a control method for outputting OSDs to the display unit 132 will be described in detail.

Figure 3:
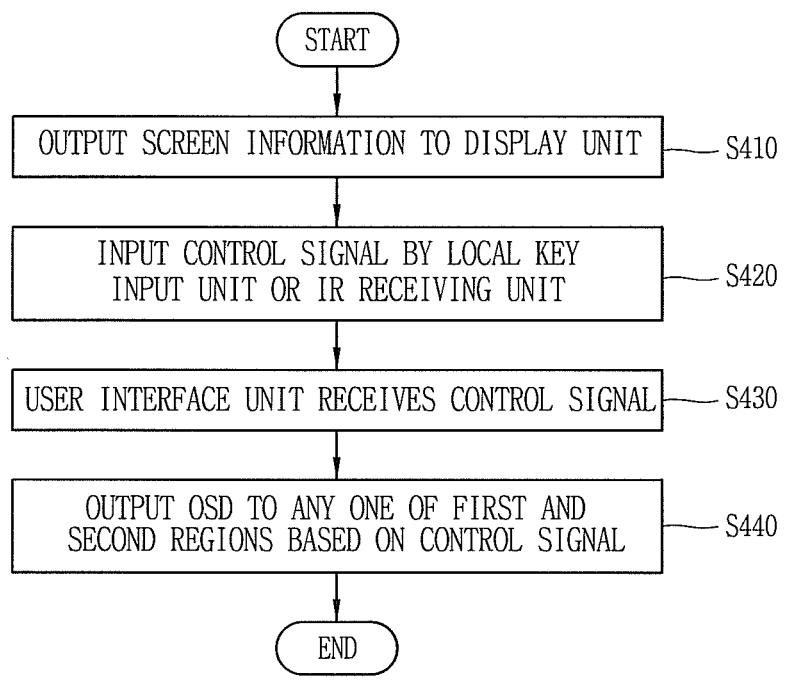
FIG. 3 is a flow chart illustrating a method for driving a video display apparatus according to an exemplary embodiment of the present disclosure.
Figure 4:
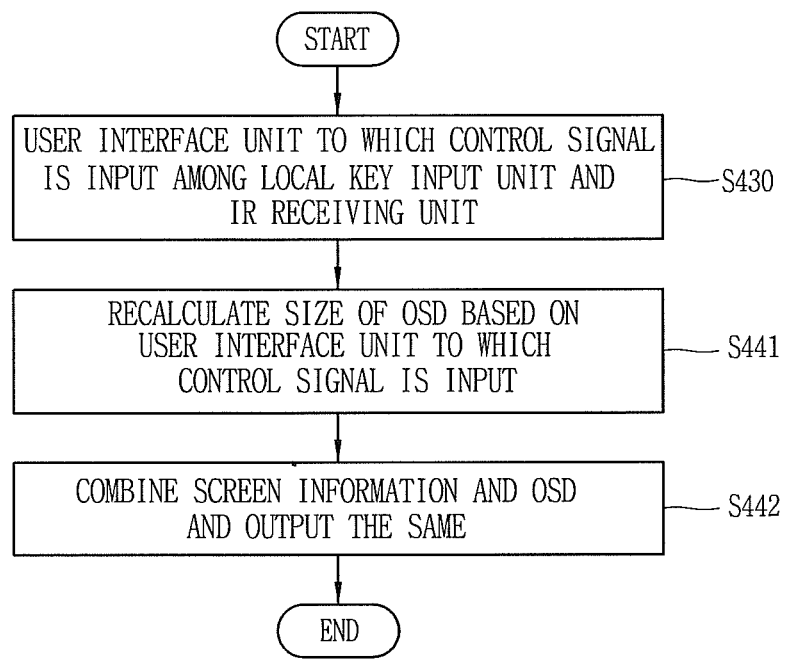
FIG. 4 is a flow chart illustrating a method for driving a video display apparatus to output OSD having different shapes.
Figure 5:
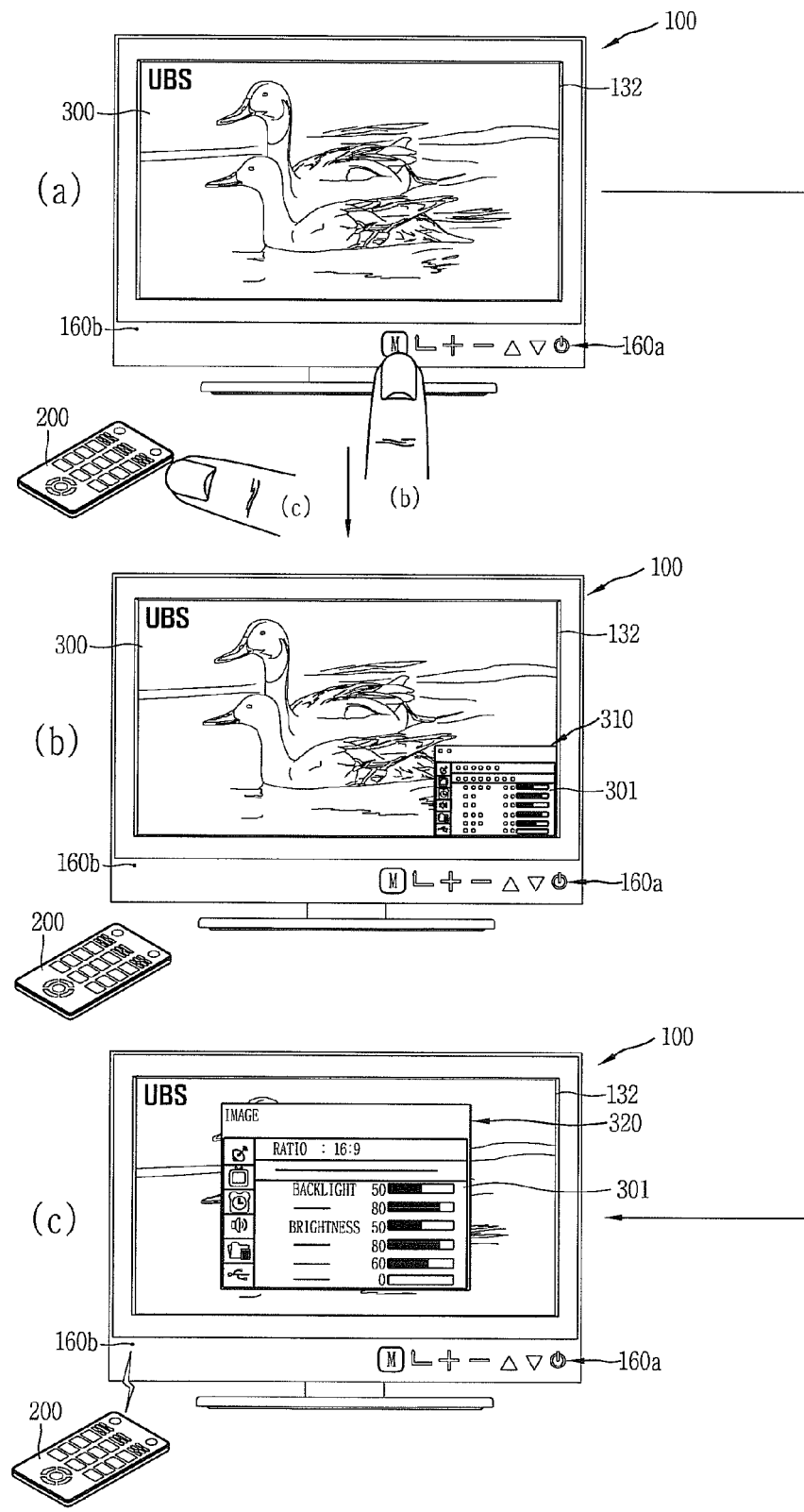
FIG. 5 is a conceptual view illustrating a driving method of FIG. 3.

FIG. 3 is a flow chart illustrating a method for driving a video display apparatus according to an exemplary embodiment of the present disclosure. FIG. 4 is a flow chart illustrating a method for driving a video display apparatus to output OSD having different shapes. FIG. 5 is a conceptual view illustrating a driving method of FIG. 3.

Referring to FIGS. 3 through 5, screen information 300 is output to the display 132 (S410). The user may change the screen information 300 displayed on the display unit 132 by applying a control command. The control signal is input by the local key input unit 160*a* or the IR receiving unit 160*b* (S420). The controller 140 receives a control signal through the local key input unit 160*a* and the IR receiving unit 160*b*.

The control method may further include an operation of detecting a user interface unit which has received the control signal, by the controller 140. Namely, the controller 140 may receive the control signal and determine whether the control signal has been input by the local key input unit 160*a* or the IR receiving unit 160*b*.

Based on the control signal, the controller 140 outputs an OSD to overlap with at least a region of the screen information 300. Here, the controller 140 controls the display unit 132 to output the OSD to a region of the display unit 132 corresponding to a configuration of the user interface unit that receives the control signal.

The controller 140 may define first and second regions 310 and 320 of the display unit 132 corresponding to the local key input unit 160a and the IR receiving unit 160b. The first and second regions 310 and 320 are defined as different positions of the display unit 132. The first and second regions 310 and 320 may be changed by a user setting.

The controller 140 controls the display unit 132 to output the OSD to a region corresponding to the user interface unit for receiving the control signal among the first and second regions 310 and 320 (S440).

Referring to (a) and (b) of FIG. 5, the display unit 132 outputs the screen information 300. The local key input unit 160a may be formed in the right side of a lower portion of the display unit 132 on the front surface 101 of the video display apparatus 100. Also, the IR receiving unit 160b may be disposed to be spaced apart from the local key input unit 160a in a lower portion of the display unit 132.

The user selects an input key for outputting a menu in the local key input unit 160a. The controller 140 controls the display unit 132 to output the OSD 301 to the first region 310 corresponding to the local key input unit 160a.

For example, the OSD may be formed to output information regarding a state of an image output in the video display apparatus, input a control command to change the configuration state, or select an output state. A configuration state of an image may correspond to a backlight, contract, brightness, sharpness, color saturation, a hue, a size of an image, or the like.

The first region 310 may be defined as a region adjacent to the local key input unit 160a on the display unit 132. Namely, the first region 310 is defined as a region adjacent to a right lower corner of the display unit 132, and the controller 140 controls the display unit to output the first OSD 301 to be adjacent to the right lower corner of the display unit 132 based on the control signal input to the local key input unit 160a.

Also, as for a size of the first region 310 for displaying the first OSD 301, the first region 310 may be formed to occupy a region of a pre-set proportion of the screen information. Namely, the first OSD 301 displayed in the first region 310 may be output to partially overlap with the overall screen information 300.

The user's eyes that have approached to apply the control signal to the local key input unit 160a may be positioned in proximity of the display unit 132, and the user's eyes may recognize only a region of the display unit 132. According to the present exemplary embodiment, the OSD by the local key input unit 160a to which a control signal has been input by the user is output a region of the display unit 132 adjacent to the local key input unit 160a, so the user may recognize information of the OSD.

Hereinafter, a control method for outputting an OSD based on a control signal by the remote controller 200 at a position spaced apart from the display unit 132 will be described.

Referring to (a) and (c) of FIG. 5, the user input a control signal to output the first OSD 301 to the IR receiving unit 160b by pressing an input key included in the remote controller 200. Namely, a wireless signal (control signal) generated by pressing an input key included in the remote controller 200 is input to the IR receiving unit 160b formed in the video display apparatus 100.

The controller 140 controls the display unit 132 to output the first OSD 301 to a second region 320 corresponding to the IR receiving unit 160b based on the control signal input to the IR receiving unit 160b. The second region 320 is defined as a position different from the first region 310. For example, the second region 320 may be defined as a central region of the display unit 132.

As for a size of the second region 320 displaying the first OSD 301, the second region 320 may be defined as a region of a pre-set proportion of the screen information 300. The size of the second region 320 may be formed to be smaller than that of the first region 310. Also, the first and second regions 310 and 320 may be defined to overlap on the display unit 132.

The first OSD 301 displayed in the second region 320 may be displayed to be relatively large in the central portion of the display unit 132, so the user located in a region relatively distant from the display unit 132 may recognize information included in the first OSD 301 more clearly.

Namely, the first OSD 301 respectively displayed in the first and second regions 310 and 320 may be output to overlap with different regions and different areas of the screen information 300.

Thus, the controller 140 detects the user interface unit 160 to which the control signal has been input among the local key input unit 160a and the IR receiving unit 160b (S430), and re-calculates a size of the first OSD 301 based on the user interface unit 160 to which the control signal has been input.

For example, in a case in which the control signal has been input to the local key input unit 160a, the controller 140 may calculate a size of the first OSD 301 as a first size to display the first OSD 301 in the first region 310. The first size may be set in advance, and the user may change it according to convenience. The first size may be set to be sufficient to allow the eyes of the user who manipulates the local key input unit 160a recognize the entire region of the first OSD 301.

Meanwhile, in a case in which a control signal is input to the IR receiving unit 160b, and the controller 140 may calculate a size of the first OSD 302 as a second size larger than the first size for displaying the first OSD 301 in the second region 310. Namely, the first OSD 301 output in the first region 310 may be scaled down at a pre-set ratio of the first OSD 301 output to the second region 320 so as to be displayed.

The controller 140 controls the display unit 132 to combine the calculated OSD and the screen information 300 and output the same (S442). Namely, the controller 140 may control the display unit 132 to combine a remaining region excluding a region covered by the first region 310 or the second region 320 of the screen information 300 and the first OSD 301 and output the same.

Accordingly, the user may be provided with an OSD disposed at a position and having a size appropriate for each interface unit by the user interface unit used to output an OSD. Thus, the user may easily recognize an OSD.

Figure 6:
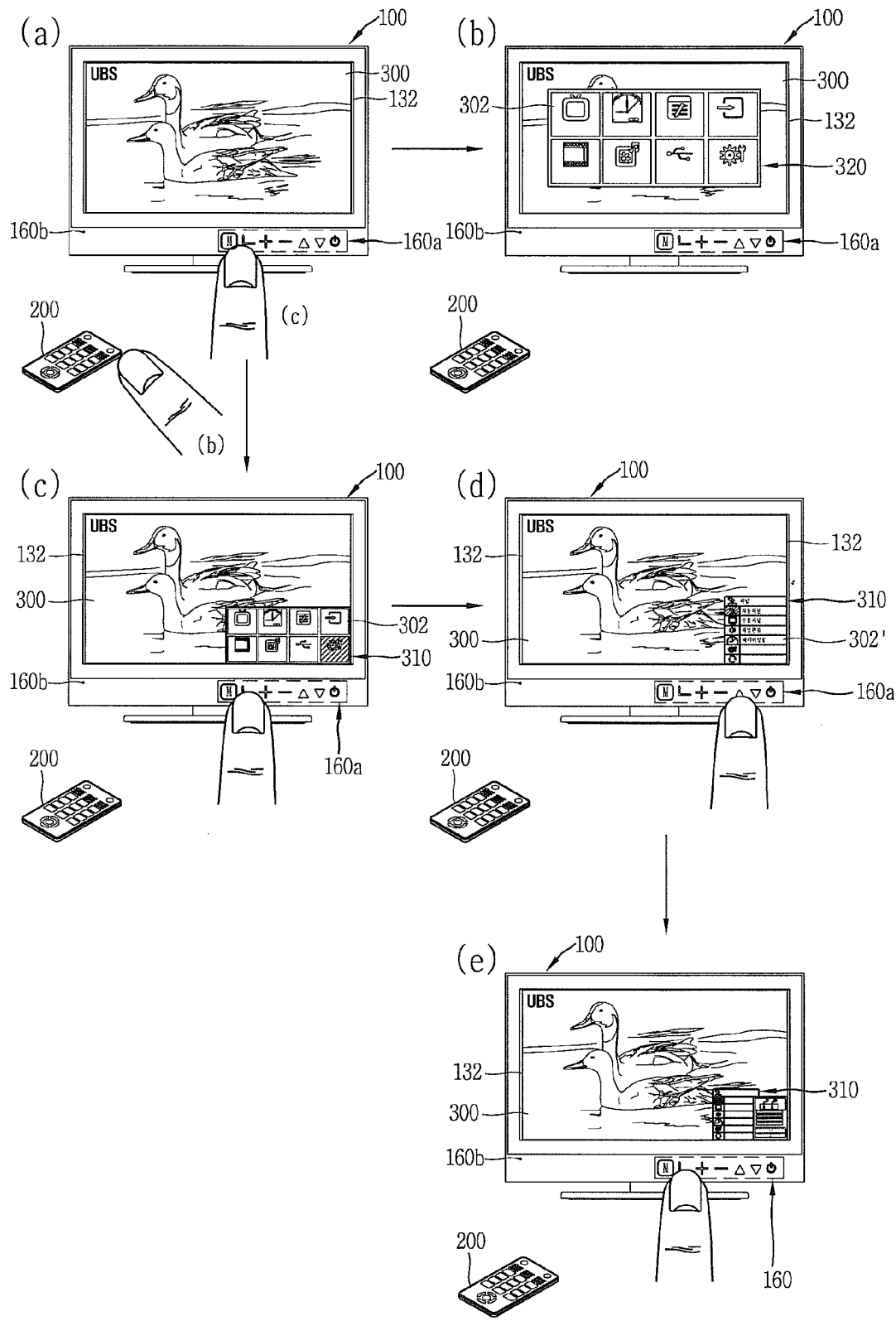
FIG. 6 is a conceptual view illustrating a control method of a video display apparatus according to another exemplary embodiment of the present disclosure.

FIG. 6 is a conceptual view illustrating a control method of a video display apparatus according to another exemplary embodiment of the present disclosure. A control method to change configuration information displayed in the OSD by using the user interface unit 160 will be described with reference to FIG. 6.

Referring to (a) and (b) of FIG. 6, when a control signal is applied to the IR receiving unit 160b by the remote controller 200, the controller 140 controls the display unit 132 to output the second OSD 302 to the second region 320 of the display unit 132.

The second OSD 302 may include a plurality of selectable taps. For example, the second OSD 302 may include the 'broadcast guidance', 'recording', 'reserved list', 'external input' 'record list', 'photograph/music', 'USB media', and 'detailed configuration' taps. However, configurations and designs of the selectable taps included in the second OSD 302 may be differently implemented based on a user setting and an operating system for driving the video display apparatus 100, without being limited to those illustrated in the drawings.

Also, although not shown, the controller 140 may change configuration information displayed on the second OSD 302 based on a control command additionally applied to an input key of the remote controller 200.

Meanwhile, referring to (a) and (b) of FIG. 6, the controller 140 controls the display unit 132 to output the second OSD 302 to the first region 310 of the display unit 132 based on a control signal input to the local key input unit 160*b*.

Referring to (b) and (c) of FIG. 6, the controller 140 selects the 'detailed configuration' tap based on a control signal applied to any one input key of the local key input unit 160*b*, and controls the display unit 132 to output a second sub-OSD 302' corresponding to the 'detailed configuration' tap.

For example, the second sub-OSD 302' illustrated in (d) of FIG. 6 may include information regarding a channel. The second sub-OSD 302' may include a sub-list regarding 'automatic channel', 'manual channel', 'channel editing', and 'data release'. The user may select the list by using an input key for moving an object to center, up, down, left, and right in the local key input unit 160*a*, and when a control command is applied to the input key, the controller 140 may control the display unit 132 to highlight the corresponding list.

Here, the controller 140 controls the display unit 132 to change the second OSD into the second sub-OSD 302' in the first region 310. Namely, when the second OSD 302 is output to the first region 310 by the local key input unit 160*a* and a control signal is continuously applied to the local key input unit 160*a*, visual information changed accordingly may also be output to the first region 310.

Referring to (e) of FIG. 6, the user may select 'automatic channel' in the list included in the second sub-OSD 302' by applying a control command to the input key included in the local key input unit 160*a*. When the 'automatic channel' tap is selected by the local key input unit 160*a*, the controller 140 may output a new window including the subordinate information of the 'automatic channel'.

Also, the controller 140 controls the display unit 132 to display a new window including subordinate information of the 'automatic channel' in the first region 310. The new window may be output to overlap with the second sub-OSD 302'.

According to the present exemplary embodiment, in a case in which the local key input unit 160*a* is manipulated to change information included in the OSD, as well as the OSD initially output by the local key input unit 160*a*, the information changed by the local key input unit 160*a* is output to the first region 310.

Thus, while the video display apparatus is being controlled by using the local key input unit, the user may be provided with an OSD having a size and output to a position allowing for the user to easily recognize it.

Figure 7A:
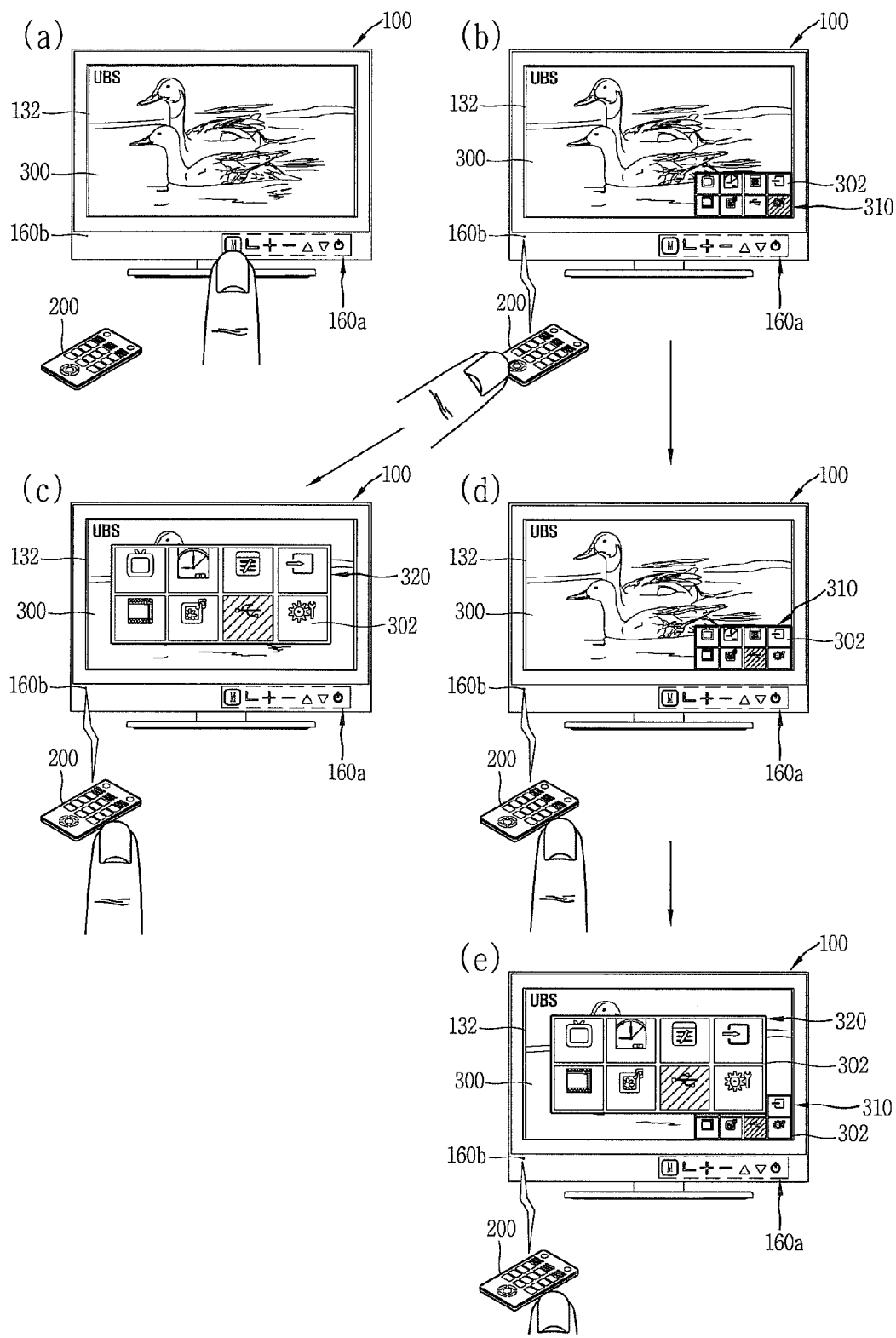
FIGS. 7A through 7c are conceptual views illustrating a method of controlling OSDs output to first and second regions according to respective exemplary embodiments of the present disclosure.
Figure 7B:
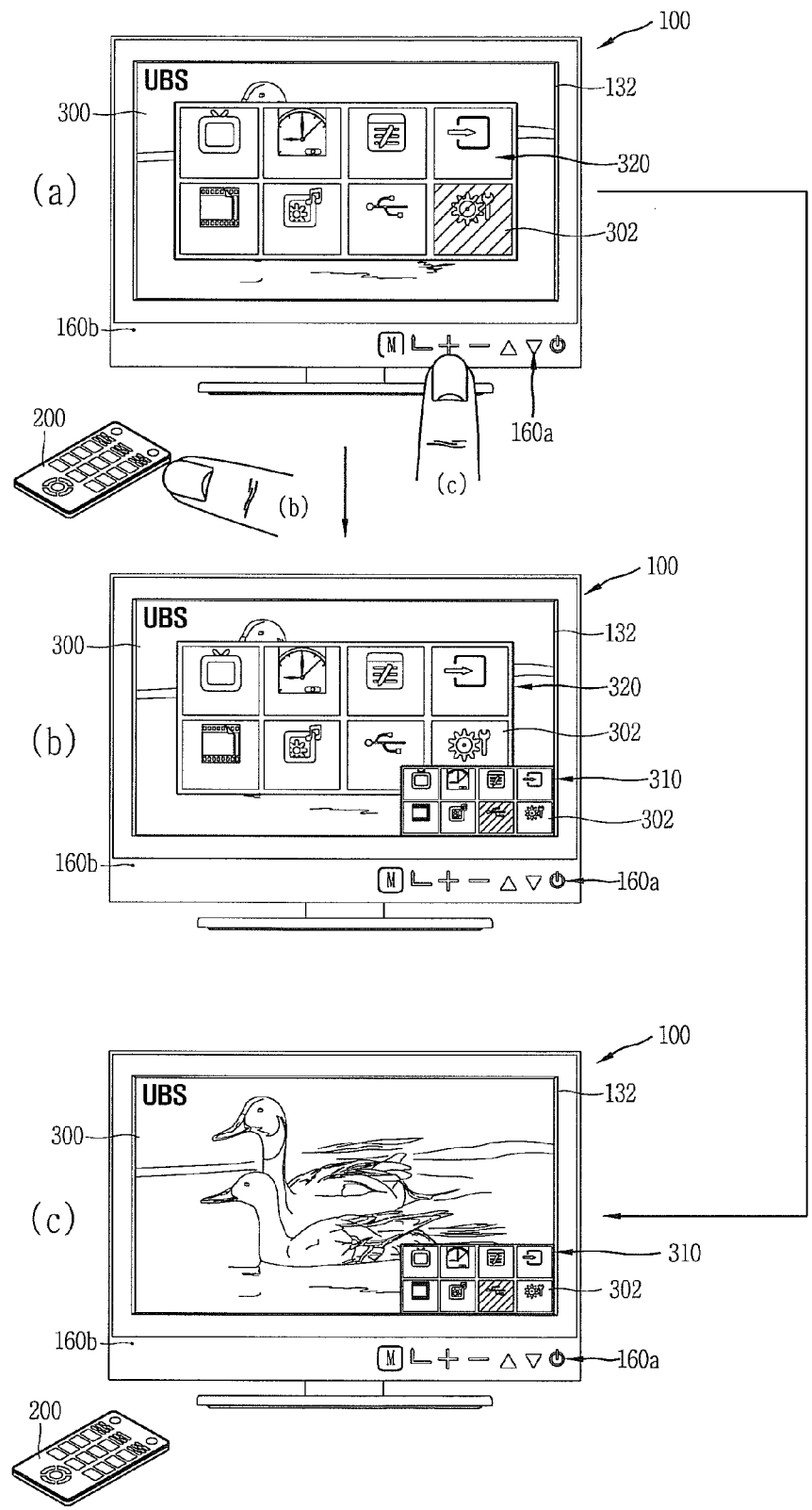
Figure 7C:
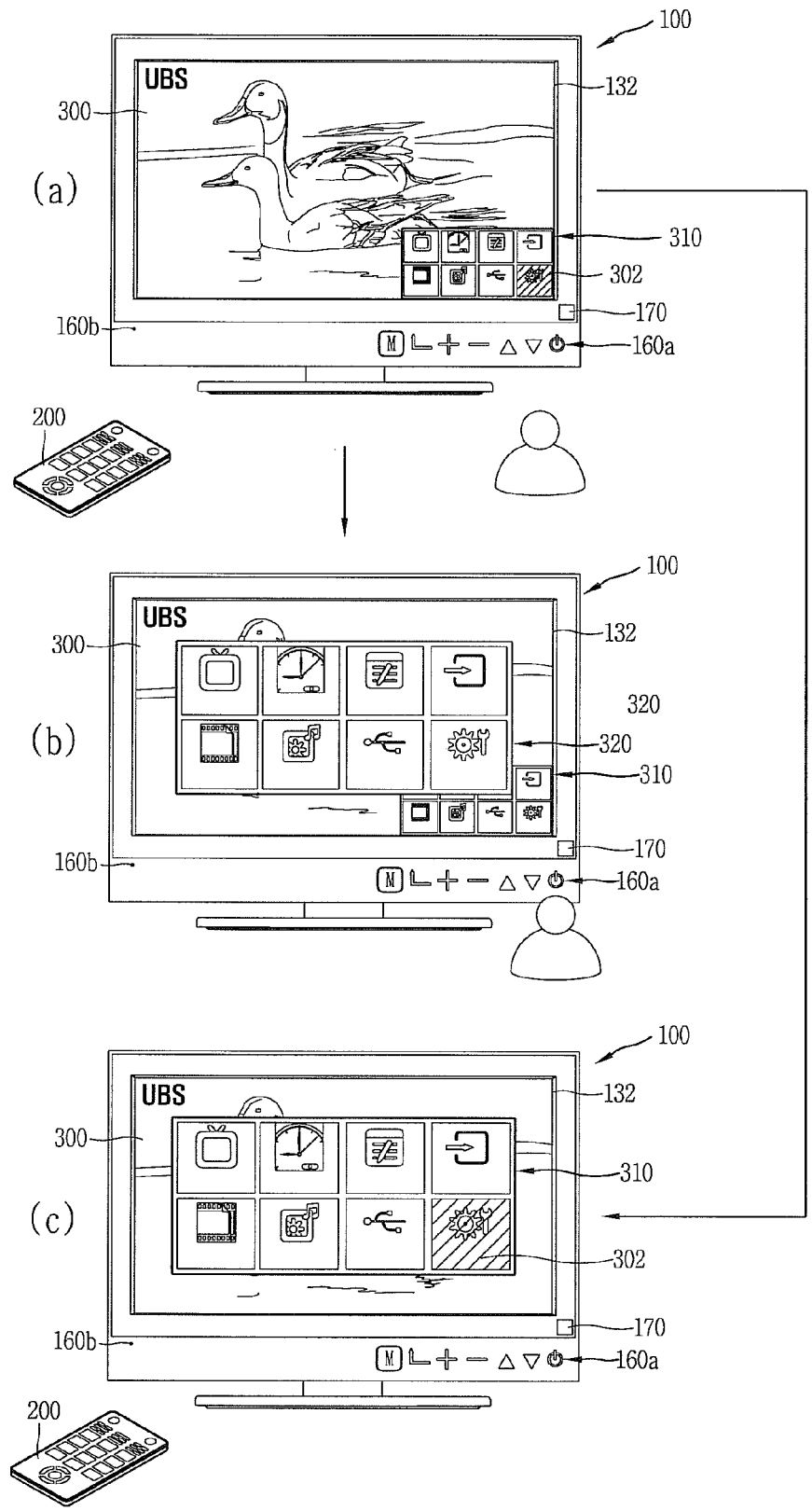

FIGS. 7A through 7C are conceptual views illustrating a method of controlling OSDs output to the first and second regions according to respective exemplary embodiments of the present disclosure.

Referring to (a) and (b) of FIG. 7A, based on a control signal input to the local key input 160*a*, the controller 140 outputs the second OSD 302 to the first region 310.

Referring to (b) and (c) of FIG. 7A, the IR receiving unit 160*b* receives a different control signal generated by a control command applied to the remote controller 200. The control signal is included in the second OSD 302 and to select a different tap, not a currently selected tap. In order to inform the user that a different tap, not the currently selected tap, has been selected by the different control signal, the controller 140 may control the display unit 132 to highlight the different tap. Namely, the controller 140 may control the display unit 132 to output the different tap in a different color or adjust brightness of the different tap based on the different control signal.

When the control detects that the IR receiving unit 160*b* has received the different control signal, the controller 140 controls the display unit 132 to limit output of the second OSD 302 displayed in the first region 310 and output the second OSD 302 to the second region 310.

Namely, when a certain control signal is input to the IR receiving unit 106*b*, the controller 140 controls the display unit 132 to output an OSD to the first region.

Meanwhile, in a state in which an OSD is output to the second region based on a control signal input to the IR receiving unit 106*b*, when a different control signal is input to the local key input unit 160*a*, the controller 140 controls the display unit 132 to output the OSD to the first region 310.

Namely, according to the present exemplary embodiment, the OSD is output to a region of the display unit 132 corresponding to a configuration of the user interface unit to which an additional control signal is applied.

Referring to (b) and (d) of FIG. 7A, in a state in which the second OSD 302 is output to the first region 310 based on a control signal input to the local key input unit 160*a*, the different control signal is input to the IR receiving unit 160*b* by the remote controller 200.

When the IR receiving unit 160*b* receives a control signal for selecting the different tap, the controller 140 controls the display unit 1332 to select the different tap in the second OSD 302 in a state of being output to the first region 310 (namely, to highlight the different tap).

Namely, according to the present exemplary embodiment, in a case in which a control signal is first applied to the local key input unit 160*a* to output the OSD to the display unit 132, even though an additional control signal is applied to the IR receiving unit 160*b*, the OSD is output in the initial output region.

Referring to (b) and (e) of FIG. 7A, in a state in which the second OSD 302 is output to the first region 310 based on a control signal input to the local key input unit 160*a*, the different control signal is input to the IR receiving unit 160*b* by the remote controller 200.

In the state in which the second OSD 302 is output to the first region 310, the controller 140 controls the display unit 132 to output the second OSD 302 to the second region 320. Namely, the second OSDs 302 each including the substantially same information and having different sizes are output to the first and second regions 310 and 320, respectively. In this case, the second OSDs 302 may be output to the respective regions such that at least portions thereof overlap.

When the different control signal is input by the IR receiving unit 160*b*, the controller 140 may control the display unit 132 to output the second OSD 302 output to the second region 320 such that it covers a portion of the second OSD 302 output to the first region 310.

According to the present exemplary embodiment, in a case in which a plurality of viewers view visual information output to the display unit 132 at different locations from the display unit 132, all of the plurality of viewers may be conveniently provided with information of an OSD and control the same.

A control method in a case in which the second OSD 302 is output to the second region 320 and a control signal is input to the local key input unit 160*a* will be described.

Referring to (a) of FIG. 7B, the display unit 132 outputs the second OSD 302 to the second region 310 based on a control signal input to the IR receiving unit 160b by the remote controller 200. In this state, a different control signal is input to the local key input unit 160a.

Referring to (b) of FIG. 7B, in a state in which the second OSD 302 is output to the second region 320, the controller 140 controls the display unit 132 to output the second OSD 302 to the first region 310. In this case, the controller 140 may control the display unit 132 to output the second OSD 302 to the first region 320 such that it covers a portion of the second OSD 302 output to the second region 320.

Meanwhile, referring to (c) of FIG. 7B, the controller 140 limits outputting of the second OSD 302 displayed in the second region 320, and controls the display unit 132 to output the second OSD 302 to the first region 310.

Thus, no matter which of the user interfaces the user use to control the display unit 132, the OSD having an appropriate size may be provided at an appropriate position of the display unit 132 according to a user intention.

A control method of controlling an OSD output position by recognizing a user location will be described with reference to FIG. 7C. The video display apparatus according to the present exemplary embodiment may include the sensor unit 170. The sensor unit 170 may be implemented as a proximity sensor, or the like.

The sensor unit 170 may be formed on the front surface 101 of the video display apparatus, and in order to sense a target (for example, the user's hand or the user) that applies a control signal to the local key input unit 160a, the sensor unit 170 may be disposed to be adjacent to the local key input unit 160a.

Referring to (a) of FIG. 7C, the display unit 132 outputs the second OSD 302 to the first region 310 based on a control command input to the local key input unit 160a by the user who approached in proximity to the display unit 132.

Referring to (a) and (b) of FIG. 7C, in a state in which the second OSD 302 is output to the first region 310, when a control signal is input to the IR receiving unit 160b by using the remote controller 200, the controller 140 controls the display unit 132 to output the second OSD 302 to the second region 320.

The sensor unit 170 senses whether the user exists in a region close to the display unit 132 (in detail, whether the user is in present in a region adjacent to the local key input unit 160a).

When it is sensed that the user exists in a region adjacent to the display unit 132 by the sensor unit 170, the controller 140 controls the display unit 132 to continuously output the second OSD 302 to the first region 302. In this case, the controller 140 may control the display unit 132 to output the second OSD 302 to the first region 310 such that the second OSD 302 displayed in the second region 320 covers a portion of the second OSD 302 output to the first region 310.

Meanwhile, referring to (a) and (c) of FIG. 7C, the sensor unit 170 senses whether the user exists in a region in proximity to the display unit 132 (in detail, whether the user exists in a region adjacent to the local key input unit 160a).

When the controller 140 determines that the user does not exist in a region adjacent to the display unit 132, the controller 140 controls the display unit 132 to limit outputting of the second OSD 302 displayed in the first region 310. Also, the controller 140 controls the display unit 132 to output the second OSD 302 to the second region 320 based on a different control signal.

In this manner, the video display apparatus according to the present exemplary embodiment determines whether a portion of a plurality of users are adjacent to the display unit 132 by using the sensor unit and controls outputting of an OSD to the first region. Thus, in a case in which the video display apparatus is controlled by a plurality of users or a user who is moving, an OSD may be provided more conveniently.

FIG. 8 is a conceptual view illustrating a driving method of outputting an OSD and a preview window according to exemplary embodiments of the present disclosure.

A method of controlling an image output to the display unit 132 when a state setting of an image is changed as a control command is input by the local key input unit 160a will be described with reference to FIG. 8.

Referring to FIG. 8, the display unit 132 outputs first screen information 300. When a control signal is applied to the local key input unit 160a, the controller 140 controls the display unit 132 to output the first OSD 301 to the first region 310. The first OSD 301 is output to a region of the display unit 132 adjacent to the local input unit 160a.

Also, the controller 140 controls the display unit 132 to output a preview window 311 to overlap with the first OSD 301. For example, when the first OSD 301 is output to be adjacent to a right lower corner of the display unit 132, the preview window 311 is output to be adjacent to the right lower corner.

The controller 140 outputs reduced screen information 300 scaled down in a pre-set ratio from the screen information 300 to the preview window 311. Namely, the user may be provided with the first OSD 301 and the reduced screen information 300 in the adjacent region together. The controller 140 controls the display unit 132 to output the reduced screen information 300 such that a region of the reduced screen information 300 is covered by the first OSD 301.

The controller 140 controls the display unit 132 to change configuration information included in the first OSD 301 based on a different control signal of the user applied to the local key input unit 160a.

In detail, the controller 140 controls the display unit 132 to change the screen information 300 included in the first OSD into modified screen information 300'. For example, based on the additional control signal, the screen information 300 may be changed into the modified screen information 300' darker than that of the screen information 300.

Also, the screen information 300 output to a remaining region other than the region of the display unit 132 in which the first OSD 301 is displayed is changed into the modified screen information 300' by adjusting brightness of the screen information 300. Namely, based on the configuration state of the changed image, the controller 140 controls the display unit 132 to downsize the modified screen information 300' to be output the same to the preview window 311.

The characteristics that brightness of an image displayed on the display unit 132 is adjusted based on a control signal have been described, but the present disclosure is not limited thereto and a state of an output image, such as chroma, or the like, may also be adjusted. According to the present exemplary embodiment, a control state of screen information output to the display unit 132 is changed based on the additional control signal. The controller 140 controls the display unit 132 to output the modified screen information 300' which has been changed from the screen information 300 according to a control state.

Also, based on the additional control signal, a type of the image or a volume of a sound output from the video display apparatus, as well as a state of outputting the image, may also be changed.

Thus, the user may change a configuration state of the image output to the display unit 132 by applying a control signal to the local key input unit 160*a* and check the changed image based on the changed configuration state by the preview window 311.

Namely, since the changed modified screen information 300' having a reduced size to be entirely output to the display unit 132 is displayed in the preview window 311 based on the control signal, the user may accurately recognize the state in which the screen information is changed by the control signal.

Meanwhile, referring to (a), (b), and (c) of FIG. 8, based on the control signal applied to the local key input unit 160*a*, the controller 140 controls the display unit 132 to output the first OSD 301 to the first region 310 adjacent to the local key input unit 160*a* of the display unit 132.

Also, the controller 140 controls the display unit 132 to output the preview window 311 to overlap with the first OSD 301. Screen information 300 scaled down at a pre-set ratio is displayed in the preview window 311.

Based on the control signal applied to the local key input unit 160*a*, the controller 140 changes the screen information 300 displayed in the first OSD 301 into modified screen information 300' having changed brightness.

The controller 140 controls the display unit 132 to limit changing of the screen information 300 displayed in a remaining region excluding the region of the display unit 132 in which the first OSD 301 is displayed.

According to the present exemplary embodiment, when an additional control signal is applied to the local key input unit 160*a*, the controller 140 changes the screen information 300 displayed in the first OSD 301 into the modified screen information 300', and controls the display unit 132 to output the screen information 300 to the other region of the display unit 132.

Thus, the user may check an image to be changed and output based on the control signal by the first OSD 301, and recognize the change based on the control signal upon comparing the first OSD 301 with the remaining region.

Although not shown, the controller 140 may limit outputting of the first OSD 301 based on a different control signal, and controls the display unit 132 to change the screen information 300 into the modified screen information 300' based on the control signal.

Although not shown, when a control signal is applied to the local key input unit 160*a*, the controller 140 may control the display unit 132 to output the screen information 300 to the first OSD 301 and output the changed modified screen information 300' to the other remaining region of the display unit 132 in which the first OSD 301 is not output.

Thus, when an output state of screen information is changed by using the local key input unit, the user may be provided with screen information in a changed output state by the control signal, through a preview window.

Figure 9A:
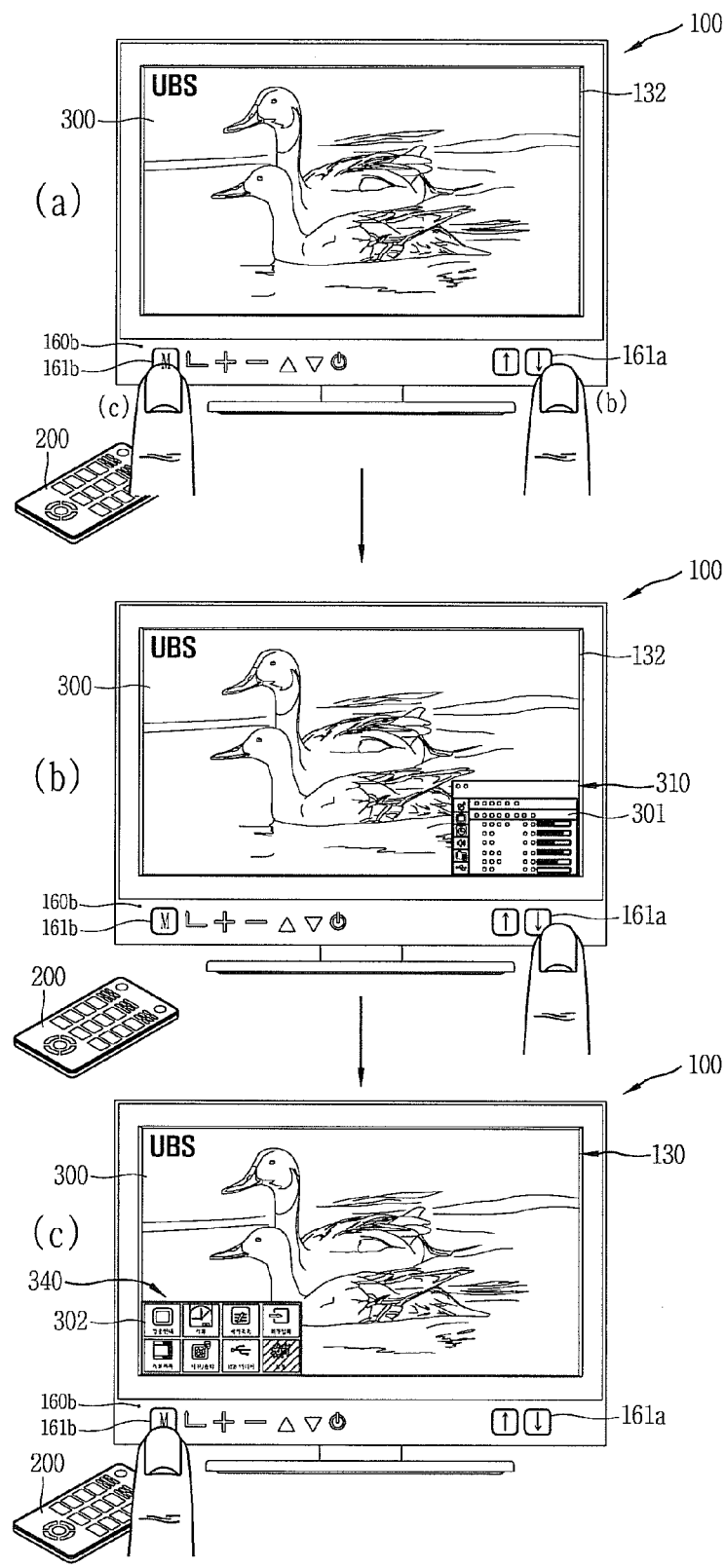
FIGS. 9A and 9B are conceptual views illustrating a driving method to output an OSD in a case of forming a plurality of local key input units in a video display apparatus.
Figure 9B:
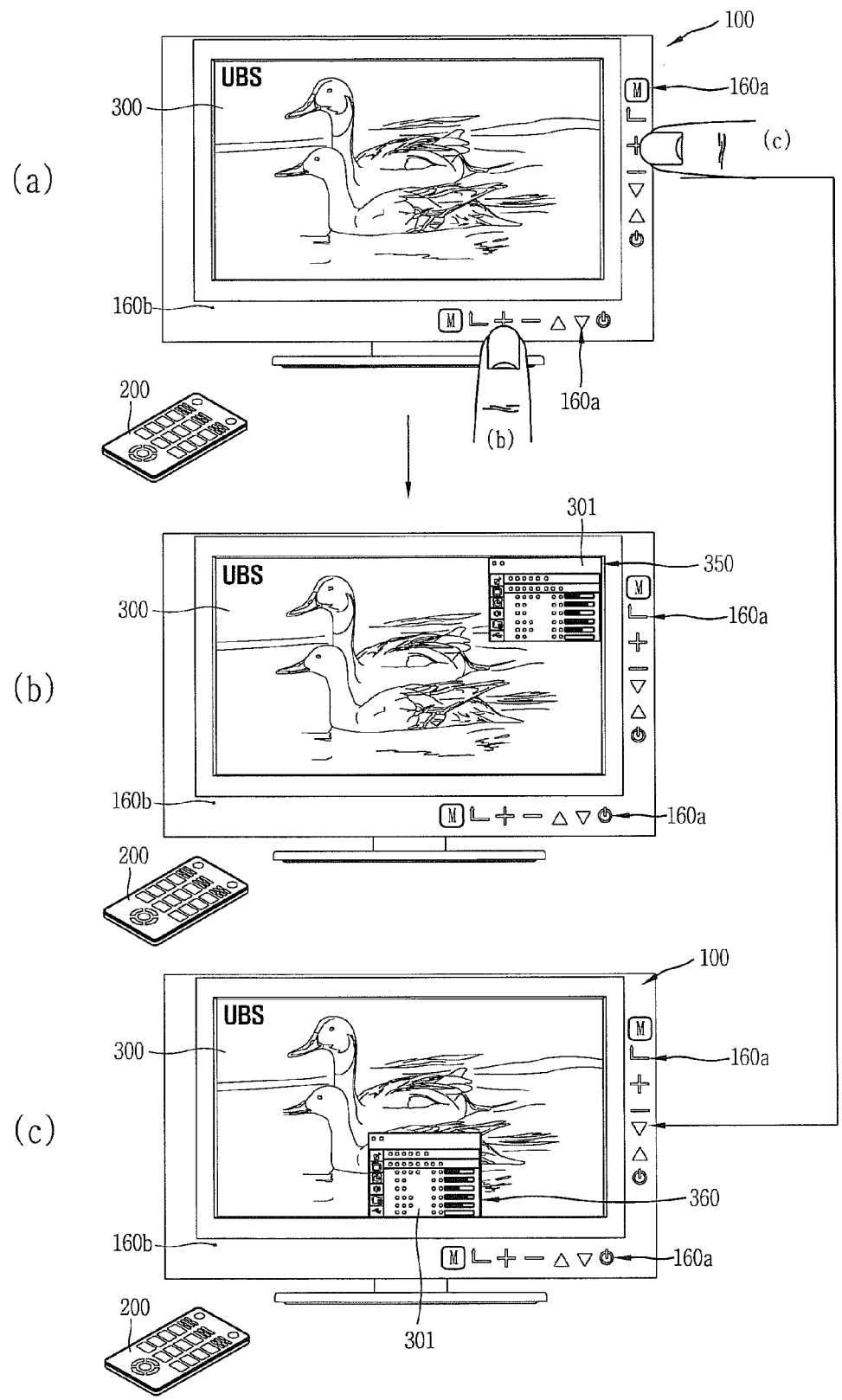

FIGS. 9A and 9B are conceptual views illustrating a driving method to output an OSD in a case of forming a plurality of local key input units in a video display apparatus.

Referring to FIG. 9A, the local key input unit 160*a* may include first and second local key modules 161*a* and 161*b*. The first and second local key modules 161*a* and 161*b* may be disposed to be spaced apart from one another in the front surface 101 of the video display apparatus 100. For example, the first and second local key modules 161*a* and 161*b* may be formed in a lower portion of the display unit 132.

The first and second local key modules 161*a* and 161*b* may be formed to receive control signals for performing different functions. For example, the first local key module 161*a* formed to be adjacent to the left side of the display unit 132 may include a menu key outputting a second OSD 302 displaying a plurality of taps related to each subordinate information for setting various functions of the video display apparatus. Meanwhile, the second local key module 161*b* formed to be adjacent to the right side of the display unit 132 may include an output setting key for controlling outputting of the first OSD 301 for controlling an output state of the screen information.

Referring to (a) and (b) of FIG. 9A, based on the control signal input to the first local key module 161*a*, the controller 140 may control the display unit 132 to output the first OSD 301 to the first region 301.

Referring to (b) and (c) of FIG. 9A, based on a control command applied to the second local key module 161*b*, the controller 140 controls the display unit 132 to output the second OSD 302 to a third region 330.

The third region 330 is defined as a region of the display unit 132 different from the first and second regions 310 and 320. The third region 330 may be defined as a region of the display unit 132 adjacent to the second local key module161*b*.

Namely, in a case in which a plurality of local key modules are formed in the video display apparatus 100, the controller 140 may define regions of the display unit 132 corresponding to the local key modules, and when a control signal is input to each local key module, the controller 140 controls the display unit 132 to output an OSD to a corresponding region. Thus, in case of a video display apparatus including the large display unit 132, the user may be provided with an OSD with respect to each local key at an appropriate location.

A control method of outputting the OSD in a case in which a plurality of local key input units 160 including local key modules performing the substantially same function are formed at different positions will be described.

Referring to (a) of FIG. 9B, the local key input unit 160*a* may be disposed to be adjacent to a lower portion of the display unit 132 and a lateral portion of the display unit 132. Local key modules included in the local key input unit 160*a* may be substantially the same.

Referring to (b) and (c) of FIG. 9B, when a control signal is applied to the local key input unit 160*a* formed to be adjacent to the lateral portion of the display unit 132, the controller 140 may output the first OSD 301 to a second modification region 350 defined to be adjacent to the lateral portion of the display unit 132.

Also, when a control signal is applied to the local key input unit 160*a* formed to be adjacent to the lower portion of the display unit 132, the controller 140 may output the first OSD 301 to a sixth region 360 defined to be adjacent to the lateral portion of the display unit 132.

Figure 10:
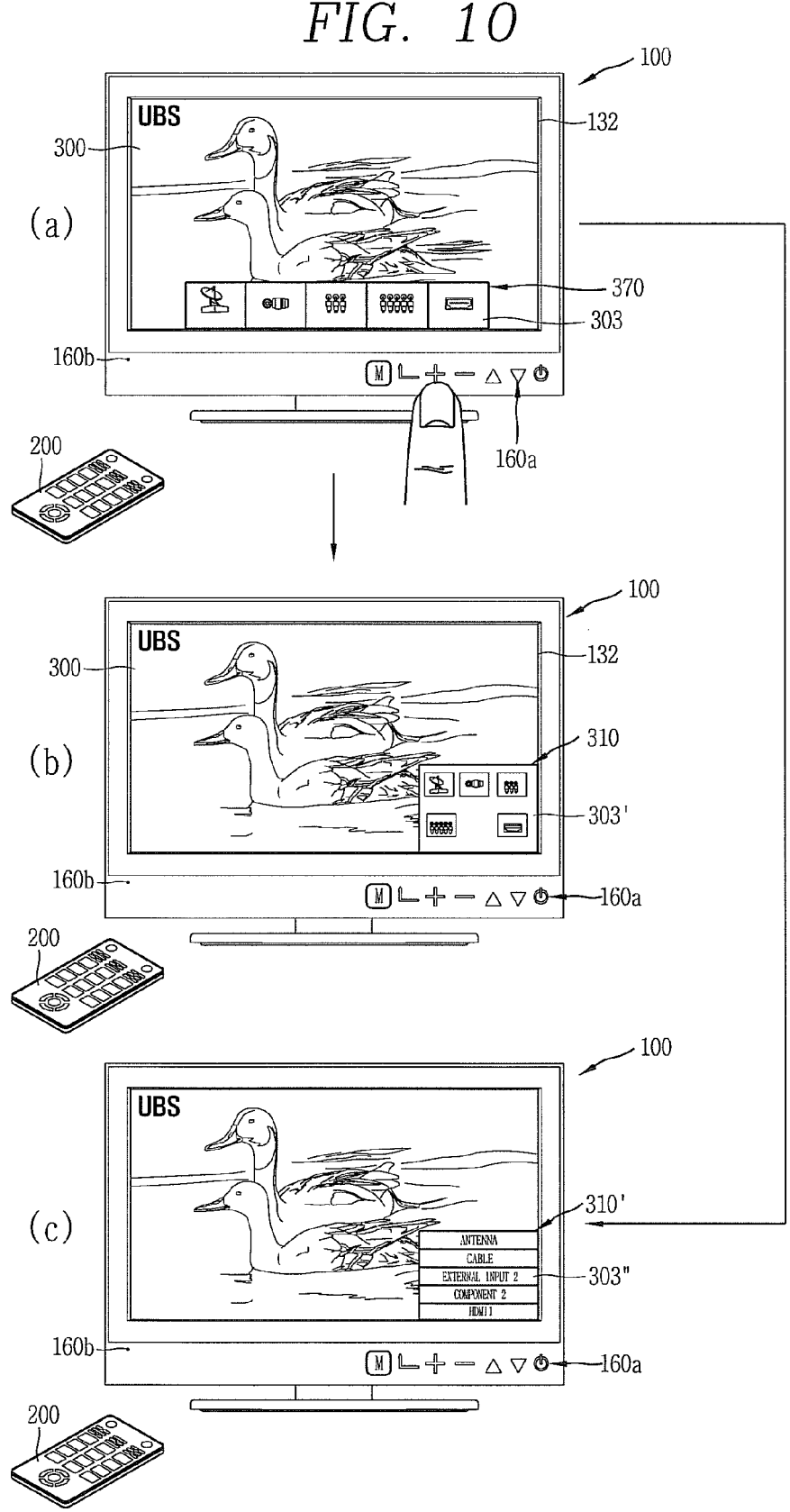
FIG. 10 is a conceptual view illustrating a control method in which a layout of information included in an OSD is changed to be output according to a region in which an OSD is output.

FIG. 10 is a conceptual view illustrating a control method in which a layout of information included in an OSD is changed to be output according to a region in which an OSD is output.

Referring to (a) of FIG. 10, based on a control signal input to the IR receiving unit 160*b* by the remote controller 200, the controller 140 controls the display unit 132 to output a third OSD 303 to a seventh region 370 on the display unit 132.

For example, the third OSD 303 may include a graphic image and text, and may include configuration information of an 'external input' including five taps arranged in a row. The five taps may include 'antenna', 'cable', 'external input 2', 'component 2', and 'HDM1'. However, information included in the third OSD is not limited thereto.

Referring to (b) of FIG. 10, when the control signal is applied to the local key input unit 160*a*, the controller 140 may control the display unit 132 to output a first modified OSD 303' to the first region 310.

Here, the first modified OSD 303' may include configuration information substantially the same as the configuration information included in the third OSD 303. Namely, the first modified OSD 303' may include five taps composed of 'antenna', 'cable', 'external input 2', 'component 2', and 'HDM1'.

However, a layout in which the respective taps of the first modified OSD 303' are disposed may be different from a layout in which respective taps included in the third OSD 303 are disposed. For example, the controller 140 may control the display unit 132 to output the respective taps included in the first modified OSD 303' such that they are arranged in two rows.

Thus, the first modified OSD 303' output to the first region 310 may be more clearly recognized by the user. Also, the layout of the first modified OSD 303' is not limited to (b) of FIG. 10 and may be modified to allow the user to easily recognize it in the first region 310.

Referring to (c) of FIG. 10, based on the control signal, the controller 140 may control the display unit 132 to output a second modified OSD 303" to the first region 310. The second modified OSD 303" may include information substantially the same as information included in the third OSD 303. Namely, the second modified OSD 303" may display the five taps. However, a shape of the five taps and a layout in which they are arranged may be different from those of the third OSD 303.

As illustrated in (c) of FIG. 10, a plurality of taps included in the second modified OSD 303" may include text representing information reach tap, without each image.

Namely, in order to output the third OSD 303 to the first region 310 defined to be relatively narrow in an output width, a layout may be changed to fit each region.

Figure 11:
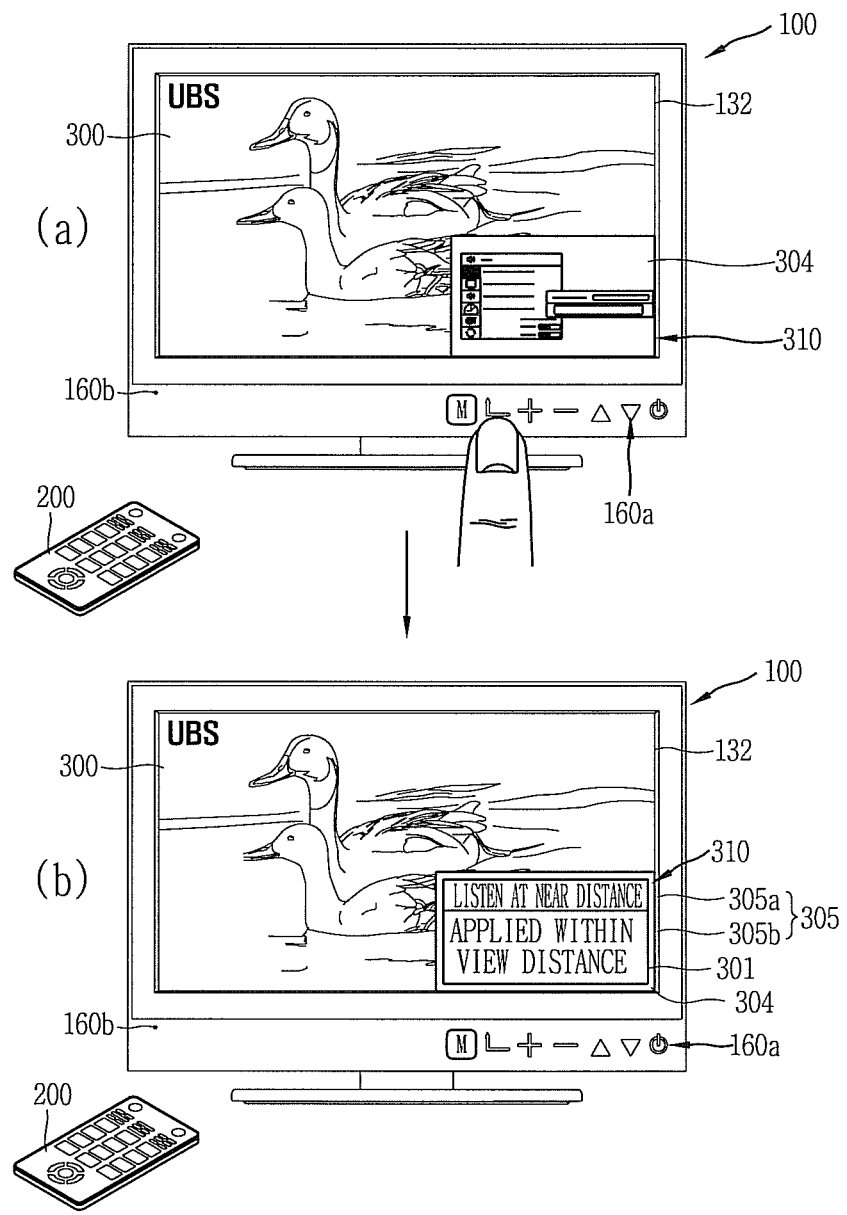
FIG. 11 is a conceptual view illustrating a method of outputting an OSD to control an output state of audio information.

FIG. 11 is a conceptual view illustrating a method of outputting an OSD to control an output state of audio information.

Referring to (a) of FIG. 11, the controller 140 controls the display unit 132 to output a fourth OSD 304 to the first region 310 based on a control signal input to the local key input unit 160*a*.

The fourth OSD 304 is an OSD for controlling a sound output from a speaker 134 and may control 'automatic sound volume', 'clear voice', 'sound balance', 'audio mode', and the like.

Referring to (b) of FIG. 11, the controller 140 may control audio output information included in the fourth OSD 304 based on a different control signal input to the local key input unit 160*a*.

Also, the controller 140 may control the display unit 132 to output a notification window 305 when the audio output information is changed based on the control signal. The notification window 305 may include a first notification window 305*a* for receiving a control command for outputting a changed sound at a short distance and a second notification window 305*b* informing that the sound has been changed.

The notification window 305 may be displayed in the first region 310 and may be output such that at least a portion thereof overlaps with the fourth OSD 304.

In general, the speaker 134 is disposed to be adjacent to the display unit 132, and adjustment of a sound is applied to a user apart from the display unit 132. A user located in the proximity of a region of the display unit may not accurately recognize the adjustment of sound.

Thus, since the user is informed that the sound has been changed, and the changed sound is output such that the user may recognize it in his or her location, and thus, the user may accurately recognize the changed sound even in a location in the proximity of the display unit 132 (substantially, the speaker 134).

Figure 12:
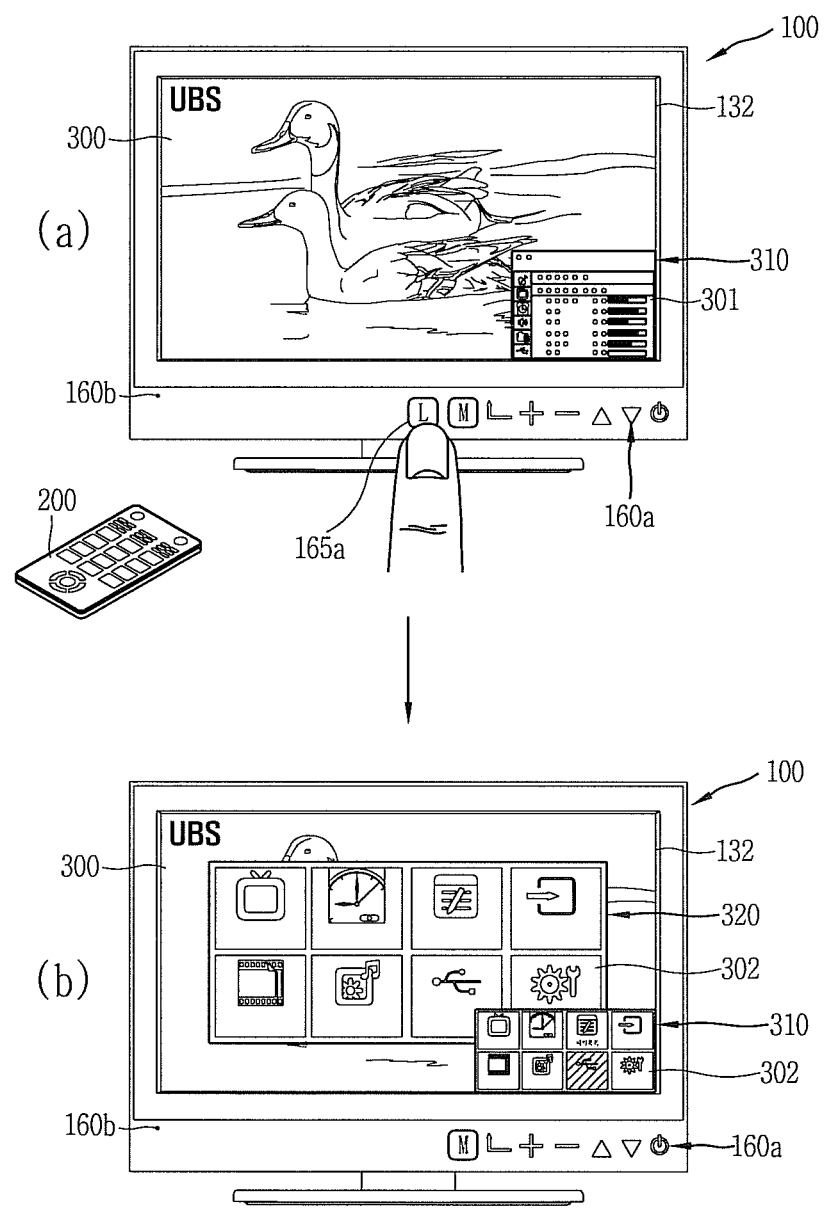
FIG. 12 is a conceptual view illustrating a control method of a video display apparatus further including an extension key for controlling a region in which an OSD is output.

FIG. 12 is a conceptual view illustrating a control method of a video display apparatus further including an extension key for controlling a region in which an OSD is output.

Referring to (a) of FIG. 12, the display unit 132 outputs the first OSD 301 to the first region 310. The local key input unit 160*a* of the video display apparatus 100 according to the exemplary embodiment further includes an extension key 165*a*.

Referring to (b) of FIG. 12, when a control signal is applied to the extension key 165*a*, the controller 140 controls the display unit 132 to output the first OSD 301 to the second region 320. In this case, the first OSD 301 displayed in the first region 310 may cover at least a portion of the first OSD 301 displayed in the second region 320.

According to the present exemplary embodiment, in a case in which a plurality of users view the video display apparatus, the first OSD 301 is output to the first region 310 by the local key input unit 160*a*, but for a user who is located distant from the display unit 132, the first OSD 301 may be additionally output to the second region 320. Thus, all of the plurality of users may be provided with the information regarding the OSD.

Also, when information using the local key input unit 160*a* and/or the remote controller 200 is changed, the controller 140 may control the display unit 132 to change the first OSD 301 output to the first and second regions 310 together.

Information included in the OSD according to each exemplary embodiment is not limited to the drawings, and various types of OSDs may be output by a control signal input by the user, by the local key to which a user's control command is applied, and an input key included in the remote controller.

The video display apparatus and the control method thereof according to the embodiments of the present disclosure as described above is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A video display apparatus comprising:
a display unit configured to output screen information;
a user interface unit that includes a local key input unit and a remote controller receiving unit, the user interface unit to receive a control signal for outputting an on-screen display (OSD) to control screen information displayed on the display unit; and
a controller configured to detect an input to the user interface unit from among the local key input unit and the remote controller receiving unit, the controller to determine whether the input is from either the local key input unit or from the remote controller receiving unit, and the controller to control the display unit to output the OSD to a first region when the input is determined to be from the local key input unit, and the controller to control the display unit to output the OSD to a second region when the input is determined to be from the remote controller receiving unit, and the second region is provided at a different position of the display unit than the first region, and the displayed OSD displays information to control characteristics of the display unit.

2. The video display apparatus of claim 1, wherein the first region is a region of the display unit adjacent to the local key input unit.

3. The video display apparatus of claim 2, further comprising:
an external signal input unit to receive a broadcast signal; and
a speaker to output a sound,
wherein the local key input unit includes:
a menu input key to receive the control signal for outputting the OSD to the display unit;
a channel adjustment input key to receive a control command for adjusting a channel;
a sound volume adjustment input key to receive a control command for adjusting a sound volume; and
an OK key to receive a control command for selecting one of information included in the OSD.

4. The video display apparatus of claim 3, wherein the local key input unit further includes a plurality of input keys, and the controller controls the display unit to output the OSD at the first region of the display unit adjacent to the plurality of input keys based on a control signal input to one of the plurality of local keys.

5. The video display apparatus of claim 2, wherein the OSD displayed at the first region or the second region to overlap a region of the screen information, and a size of the OSD displayed at the first region is smaller than a size of the OSD displayed at the second region.

6. The video display apparatus of claim 5, wherein the controller changes a size of the first region or the second region of the display unit based on a user setting.

7. The video display apparatus of claim 5, wherein the controller changes a position of the first region or the second region of the display unit based on a user setting.

8. The video display apparatus of claim 1, wherein when a control signal is applied to the local key input unit while the OSD is displayed at the second region, the controller controls the display unit to output the OSD at the first region.

9. The video display apparatus of claim 1, wherein when a different control signal is applied to the remote controller receiving unit while the OSD is displayed at the first region, the controller controls the display unit to output the OSD at the second region.

10. The video display apparatus of claim 9, further comprising:
a sensor unit configured to sense a user located adjacent to the display unit,
wherein when the user is sensed by the sensor unit, the controller controls the display unit to continuously output the OSD at the first region of the display unit.

11. The video display apparatus of claim 1, wherein the controller controls the display unit to output a preview window for outputting screen information displayed at the first region and being reduced by a pre-set ratio, and
the controller controls the display unit to output the OSD displayed at the first region such that the OSD covers a portion of the reduced screen information displayed in the preview window.

12. The video display apparatus of claim 1, wherein the information included in the OSD includes at least one tap, and the controller controls the display unit to differently display a plurality of taps of the OSD displayed at the first region and a plurality of taps of the OSD displayed at the second region.

13. A method of a video display apparatus, the method comprising:
receiving, at a local key input unit or an infrared (IR) receiving unit, a control signal for changing an output state of screen information at a display unit;
detecting one of the local key input unit and the IR receiving unit to which the control signal is received;
determining whether the control signal is received at the local key input unit or at the IR receiving unit; and
outputting an on-screen display (OSD) that includes information for changing an output state of the display unit to a first region of the display unit when the control signal is determined to be from the local key input unit or to a second region of the display unit when the control signal is determined to be from the IR receiving unit, and the OSD displays information to control characteristics of the display unit.

14. The method of claim 13, further comprising:
calculating a size of the OSD to output the OSD at the first region or the second region; and
combining the OSD and the screen information and displaying the combined OSD and screen information at the display unit.

15. The method of claim 14, further comprising:
outputting the OSD at the second region based on a control signal input to the IR receiving unit when the OSD is output at the first region of the display unit.

16. The method of claim 13, wherein the first region is adjacent to the local key input unit.

17. The method of claim 13, wherein outputting the OSD includes displaying the OSD at the first region or the second region to overlap a region of the screen information, and a size of the OSD displayed at the first region is smaller than a size of the OSD displayed at the second region.

18. The method of claim 17, further comprising changing a size or a position of the first region or the second region based on a user setting.

19. The method of claim 13, wherein in response to a control signal applied to the local key input unit while the OSD is displayed at the second region, the display unit to display the OSD at the first region.

20. The method of claim 13, further comprising:
displaying a preview window that outputs screen information displayed at the first region and being reduced by a pre-set ratio, and
displaying the OSD displayed at the first region such that the OSD covers a portion of the reduced screen information displayed at the preview window.

21. A display apparatus comprising:
an external signal input unit to receive a broadcast signal;
a display unit to display screen information;
a user interface unit to display an on-screen display (OSD) for controlling screen information displayed on the display unit, the user interface unit to include a local key input unit and an infrared (IR) receiving unit; and
a controller to detect an input to the user interface unit, the controller to determine whether the input is from either the local key input unit or from the IR receiving unit, and the controller to control the display unit to display the OSD at a first region when the input is determined to be from the local key input unit, and the controller to control the display unit to display the OSD at a second region when the input is determined to be from the IR receiving unit, the OSD to display information to control characteristics of the display unit, and the OSD displayed at the first region includes same information as the OSD displayed at the second region, wherein the local key input unit includes:
- a menu input key to receive the control signal for outputting the OSD to the display unit,
- a channel adjustment input key to receive a control command for adjusting a channel, and
- a sound volume adjustment input key to receive a control command for adjusting a sound volume.

22. The display apparatus of claim 21, wherein the OSD displayed at the first region or the second region to overlap a region of the screen information, and a size of the OSD displayed at the first region is smaller than a size of the OSD displayed at the second region.

23. The display apparatus of claim 22, wherein the controller changes a size or a position of the first region or the second region of the display unit based on a user setting.

24. The display apparatus of claim 21, wherein in response to a control signal applied to the local key input unit while the OSD is displayed at the second region, the controller controls the display unit to display the OSD at the first region of the display unit.

25. The display apparatus of claim 21, wherein the controller controls the display unit to display a preview window that provides screen information displayed at the first region and being reduced by a pre-set ratio, and
the controller controls the display unit to output the OSD displayed at the first region such that the OSD covers a portion of the reduced screen information displayed in the preview window.

26. The video display apparatus of claim 1, wherein the OSD displayed at the first region includes similar information as the OSD displayed at the second region.

27. The method of claim 13, wherein the OSD displayed at the first region includes similar information as the OSD displayed at the second region.

* * * * *